(12) United States Patent
Duesler et al.

(10) Patent No.: US 11,041,677 B2
(45) Date of Patent: Jun. 22, 2021

(54) HEAT EXCHANGER FOR COOLING MEDIUM TEMPERATURE REDUCTION

(71) Applicant: United Technologies Corporation, Hartford, CT (US)

(72) Inventors: Paul W. Duesler, Manchester, CT (US); Joseph W. Bridges, Jr., Durham, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 261 days.

(21) Appl. No.: 14/987,393

(22) Filed: Jan. 4, 2016

(65) Prior Publication Data
US 2017/0191762 A1    Jul. 6, 2017

(51) Int. Cl.
| F28D 7/00 | (2006.01) |
| F28D 7/02 | (2006.01) |
| F02C 7/12 | (2006.01) |
| B23P 15/26 | (2006.01) |
| F28D 21/00 | (2006.01) |

(52) U.S. Cl.
CPC ............ *F28D 7/0016* (2013.01); *B23P 15/26* (2013.01); *F02C 7/12* (2013.01); *F28D 7/0033* (2013.01); *F28D 7/022* (2013.01); *F28D 7/024* (2013.01); *F05D 2230/31* (2013.01); *F05D 2260/213* (2013.01); *F28D 2021/0026* (2013.01); *Y02T 50/60* (2013.01)

(58) Field of Classification Search
CPC .... F28D 7/0016; F28D 7/0033; F28D 7/0008; F28D 7/024; F28D 7/0066; F28D 7/02
See application file for complete search history.

(56) References Cited

U.S. PATENT DOCUMENTS

| 1,852,489 A | * | 4/1932 | Sullivan ................. F28D 7/024 |
| | | | 165/156 |
| 2,252,045 A | | 8/1941 | Spanner |

(Continued)

FOREIGN PATENT DOCUMENTS

| FR | 601895 A | | 3/1926 | |
| GB | 1200416 A | * | 7/1970 | .............. F22B 21/26 |

(Continued)

OTHER PUBLICATIONS

EP search report for EP17150248.7 dated Jun. 6, 2017.
Wikipedia.org, "Heat Exchanger", accessed from <https://en.wikipedia.org/wiki/Heat_exchanger> on Oct. 26, 2015.
Manish N. Kuvadiya, "Parametric Analysis of Tube in Tube Helical Coil Heat Exchanger at Constant Wall Temperature", IJSTE—International Journal of Science Technology & Engineering, vol. 1, Issue 10, ISSN (online): 2349-784X, Apr. 2015.

(Continued)

*Primary Examiner* — Travis C Ruby
*Assistant Examiner* — Harry E Arant
(74) *Attorney, Agent, or Firm* — Getz Balich LLC

(57) ABSTRACT

Aspects of the disclosure are directed to a heat exchanger comprising: a first plurality of channels configured to convey a first medium at a first set of temperatures along a first span of the first plurality of channels, the first set of temperatures including a first inlet temperature and a first outlet temperature, a second plurality of channels configured to convey a second medium at a second set of temperatures along a second span of the second plurality of channels, the second set of temperatures being at least partially different from the first set of temperatures and including a second inlet temperature and a second outlet temperature, and a core region where the first plurality of channels and the second plurality of channels are co-mingled with respect to one another.

11 Claims, 8 Drawing Sheets

(56) References Cited

U.S. PATENT DOCUMENTS

| | | | |
|---|---|---|---|
| 3,850,230 | A | 11/1974 | Margen |
| 3,976,129 | A | 8/1976 | Silver |
| 4,305,460 | A | 12/1981 | Yampolsky |
| 5,094,224 | A | 3/1992 | Diesch |
| 5,238,058 | A | 8/1993 | Bodrey |
| 6,988,542 | B2 * | 1/2006 | Hughes ................ F28D 7/0008 165/109.1 |
| 7,337,835 | B2 | 3/2008 | Nigam |
| 2005/0103482 | A1 | 5/2005 | Park et al. |
| 2005/0189094 | A1 * | 9/2005 | Van Decker ............ F28D 7/024 165/140 |
| 2011/0088405 | A1 * | 4/2011 | Turco ..................... F01D 5/081 60/782 |
| 2012/0149944 | A1 * | 6/2012 | Zmierczak ................ B01J 8/22 568/698 |
| 2013/0206374 | A1 * | 8/2013 | Roisin .................... B22F 7/002 165/165 |
| 2013/0247587 | A1 * | 9/2013 | Lo ........................ F01D 17/105 60/806 |
| 2015/0035392 | A1 | 2/2015 | Pal |

FOREIGN PATENT DOCUMENTS

| | | | |
|---|---|---|---|
| JP | 2008190778 A * | 8/2008 | |
| WO | WO2014036476 A2 | 3/2014 | |
| WO | 2015/067565 | 5/2015 | |

OTHER PUBLICATIONS

N.D. Shirgire, "Review on Comparative Study between Helical Coil and Straight Tube Heat Exchanger", IOSR Journal of Mechanical and Civil Engineering (IOSR-JMCE), vol. 8, Issue 2, pp. 55-59, Jul.-Aug. 2013.

Mohammed Imran, "CFD Analysis of Heat Transfer Rate in Tube in Tube Helical Coil Heat Exchanger", International Journal of Innovative Science, Engineering & Technology, vol. 2, Issue 8, ISSN 2348-7968, Jul. 2015.

Pramod S. Purandare, "Experimental Investigation on Heat Transfer and Pressure Drop of Conical Coil Heat Exchanger With Parameters Tube Diameter, Fluid Flow Rates and Cone Angle", available from <http://www.doiserbia.nb.rs/img/doi/0354-9836/2014%20OnLine-First/0354-98361400137P.pdf> on Oct. 26, 2015.

S.K. Mandore, "A Review on Performance Enhancement of Tube Coil Heat Exchanger by using Helical Tube", IJRMET vol. 5, Issue 1, ISSN: 2249-5762 (online), ISSN: 2249-5770 (print), Nov. 2014-Apr. 2015.

Kaliannan Saravanan, "Analysis of Heat Transfer Enhancement in Spiral Plate Heat Exchanger", Modern Applied Science vol. 2, No. 4, Jul. 2008.

Digvijay D. Shinde, "Heat Transfer Analysis of a Cone Shaped Helical Coil Heat Exchanger", International Journal of Innovations in Engineering and Technology, vol. 3 Issue 1, ISSN: 2319-1058, pp. 56-62, Oct. 2013.

* cited by examiner

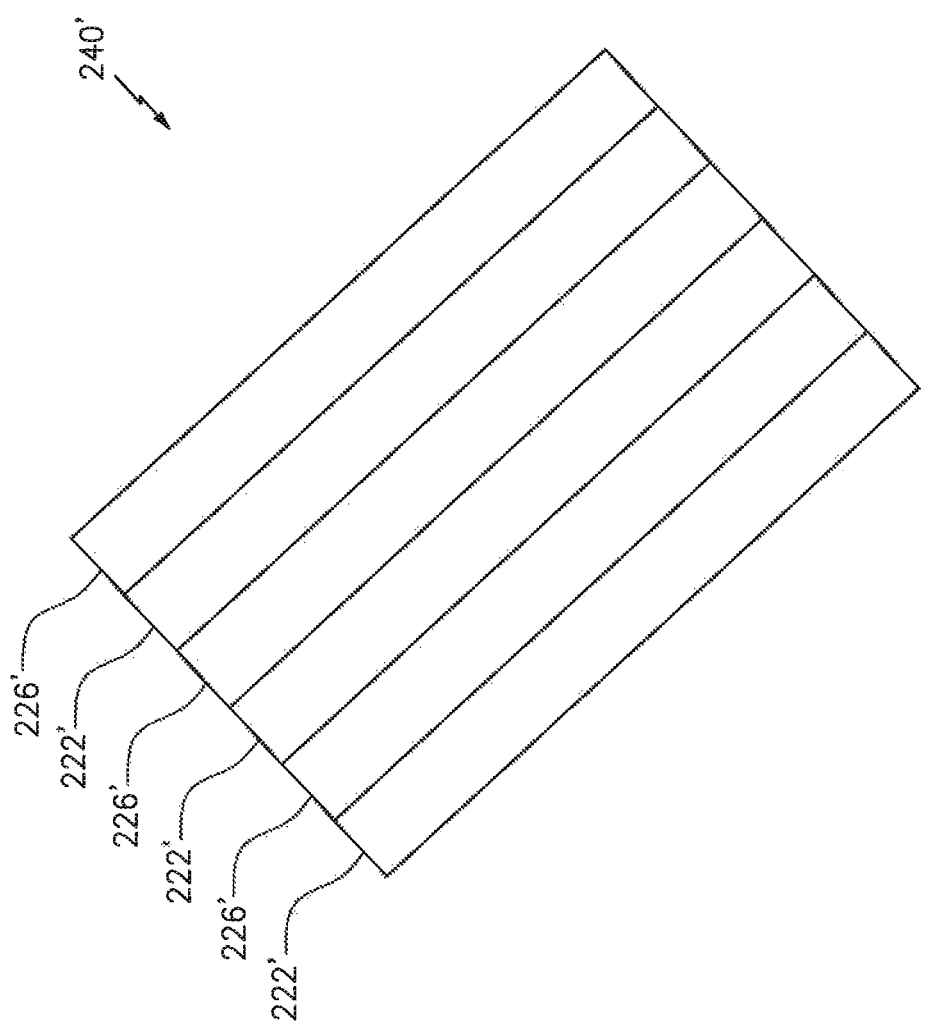

HEAT EXCHANGER FOR COOLING MEDIUM TEMPERATURE REDUCTION

BACKGROUND

Gas turbine engines, such as those which power modern aircraft, include a compressor to pressurize a supply of air, a combustor to burn a hydrocarbon fuel in the presence of the pressurized air, and a turbine to extract energy from the resultant combustion gases and generate thrust.

As one of skill in the art appreciates, temperatures within various parts or sections of the engine need to be maintained within temperature tolerances/ranges in order to maintain the engine in a quality working condition and in order to promote the useable lifetime of engine components. For example, the combustion of the fuel in the presence of the air results in elevated temperatures that may be subsequently imposed on, e.g., a liner of the combustor, the turbine, etc.

Air may be provided to the components subjected to the elevated temperatures in order cool them and to counter the impact of such elevated temperatures. However, the air itself may have a slightly elevated temperature, thereby reducing the cooling efficiency thereof. Still further, use of the air in cooling results in a pressure loss that degrades efficiency.

Given that the air used in cooling represents a limited resource within the engine, what is needed are improved techniques for maximizing the cooling capability/capacity of the air for a given volume/unit of the air while minimizing pressure loss.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a heat exchanger comprising: a first plurality of channels configured to convey a first medium at a first set of temperatures along a first span of the first plurality of channels, the first set of temperatures including a first inlet temperature and a first outlet temperature, a second plurality of channels configured to convey a second medium at a second set of temperatures along a second span of the second plurality of channels, the second set of temperatures being at least partially different from the first set of temperatures and including a second inlet temperature and a second outlet temperature, and a core region where the first plurality of channels and the second plurality of channels are co-mingled with respect to one another. In some embodiments, the first plurality of channels and the second plurality of channels are substantially parallel to one another in the core region. In some embodiments, each of a first count of the first plurality of channels is at least partially wrapped by a second count of the second plurality of channels in the core region. In some embodiments, the wrapping adheres to a helical or spiral shape. In some embodiments, at least three channels of the second plurality of channels are used to wrap a first of the first plurality of channels. In some embodiments, the heat exchanger further comprises: a first port coupled to a first end of the first plurality of channels, a second port coupled to a second end of the first plurality of channels, a third port coupled to a first end of the second plurality of channels, and a fourth port coupled to a second end of the second plurality of channels. In some embodiments, the first and third ports are configured as inlets, and the second and fourth ports are configured as outlets. In some embodiments, at least one of the first plurality of channels and the second plurality of channels is arranged as a plurality of layers. In some embodiments, the second plurality of channels is configured to receive the second medium from at least one of a compressor section of an engine, a fan section of the engine, a bleed valve, or a source that is external to the engine. In some embodiments, a first channel of the first plurality of channels includes at least one link configured to reverse an orientation of the first channel. In some embodiments, the first set of temperatures is greater than the second set of temperatures, and the temperature of the first plurality of channels is configured to be reduced in stages along at least one dimension of the first plurality of channels. In some embodiments, the heat exchanger further comprises a first plurality of inlets that map to a second plurality of outlets. In some embodiments, the heat exchanger further comprises a plurality of inlets that map to a common outlet. In some embodiments, the heat exchanger further comprises an inlet that maps to a plurality of outlets.

Aspects of the disclosure are directed to a method of manufacturing a heat exchanger configured to be used on an aircraft engine, the method comprising: additively manufacturing at least one of a first plurality of channels, a second plurality of channels, or a core region, where the first plurality of channels is configured to convey a first medium at a first set of temperatures along a first span of the first plurality of channels, where the second plurality of channels is configured to convey a second medium at a second set of temperatures along a second span of the second plurality of channels, the second set of temperatures being at least partially different from the first set of temperatures, and where in the core region the first plurality of channels and the second plurality of channels are co-mingled with respect to one another. In some embodiments, the first medium and the second medium are different types of mediums.

BRIEF DESCRIPTION OF THE DRAWINGS

The present disclosure is illustrated by way of example and not limited in the accompanying figures in which like reference numerals indicate similar elements.

FIG. 3 illustrates tubular channels of a heat exchanger arranged in parallel in a core region in accordance with aspects of this disclosure.

DETAILED DESCRIPTION

Figure 1:
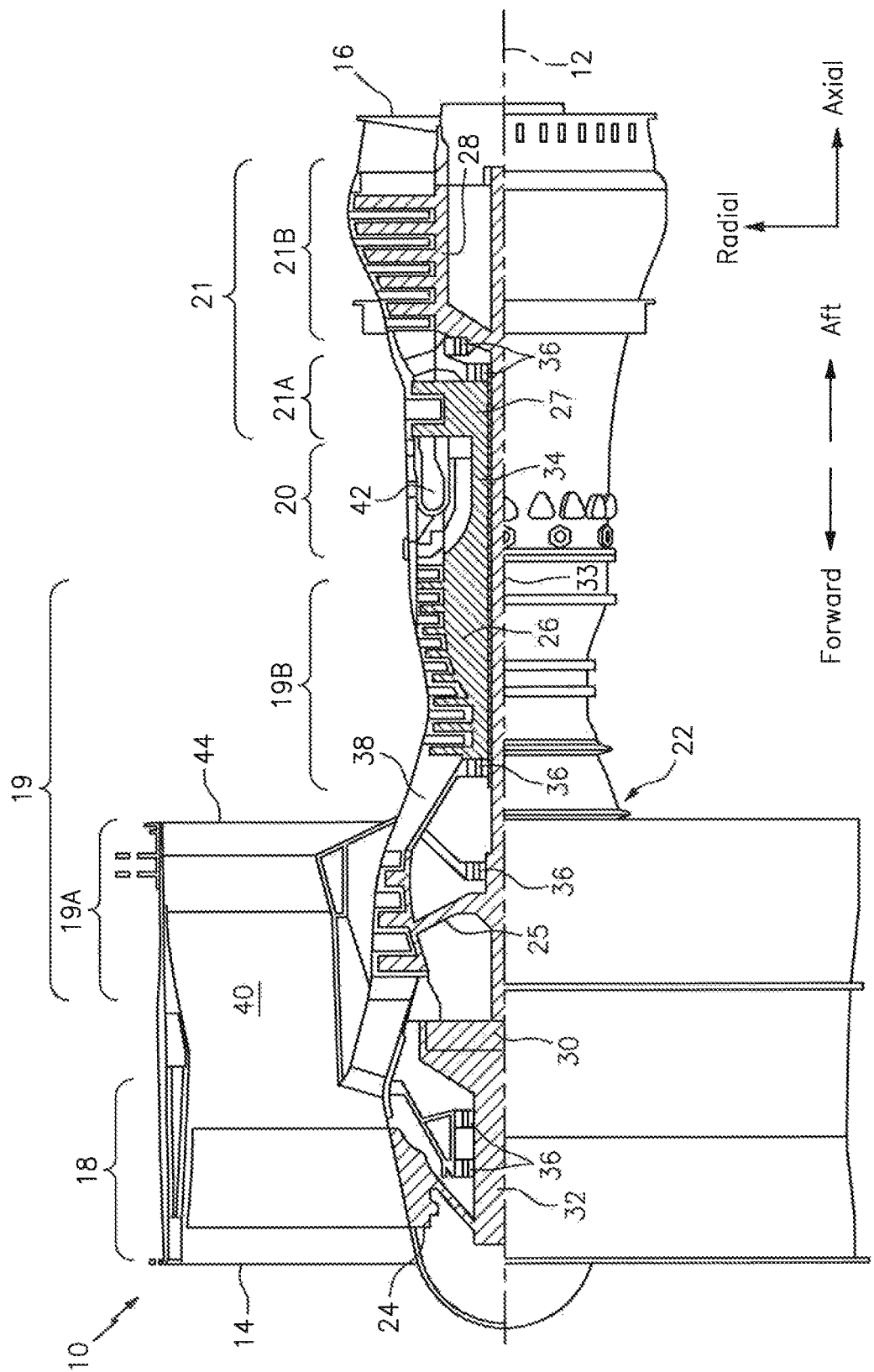
FIG. 1 is a side cutaway illustration of a geared turbine engine.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for providing one or more heat exchangers in connection with an engine. In some embodiments, a heat exchanger may include a channel at a first (e.g., elevated or hot) temperature or first set of temperatures surrounded by multiple channels at a second temperatures or second set of temperatures (e.g., at one or more temperatures that are less than the first temperature). Still further, one or more channels may experience a change in temperature over a dimension or span of the channel(s). The multiple of channels, collectively or individually, may assume one or more patterns, such as for example a spiral or helix shape. A wall thickness associated with the heat exchanger may be greater than a first threshold amount to provide for a predetermined heat exchange capacity/capability while at the same time being less than a second threshold amount so as to not unnecessarily add weight to the engine. The heat exchanger may be configured to extract heat from pressurized cooling air and dispense of that heat by providing it to cooler, lower pressure airstreams via heat transfer processes. Through the body of a heat exchanger, each hot channel may have associated cold channels which will affect it individually. These associated channels may be referred to as cells. Cells may be strategically positioned into patterns which can be easily disseminated through a separation zone into first (e.g., hot) and second (e.g., cold) feeds. Cells can be patterned to assimilate the space that the body may occupy.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the ITT rotor 28 through a low speed shaft 33. The HPC rotor 26 is connected to and driven by the HPT rotor 27 through a high speed shaft 34. The shafts 32-34 (e.g., outer surfaces of the shafts) are rotatably supported by a plurality of bearings 36; e.g., rolling element and/or thrust bearings. Each of these bearings 36 is connected to the engine housing 22 by at least one stationary structure such as, for example, an annular support strut.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for an engine of an aircraft (e.g., an airplane, a helicopter, etc.).

Figure 2:
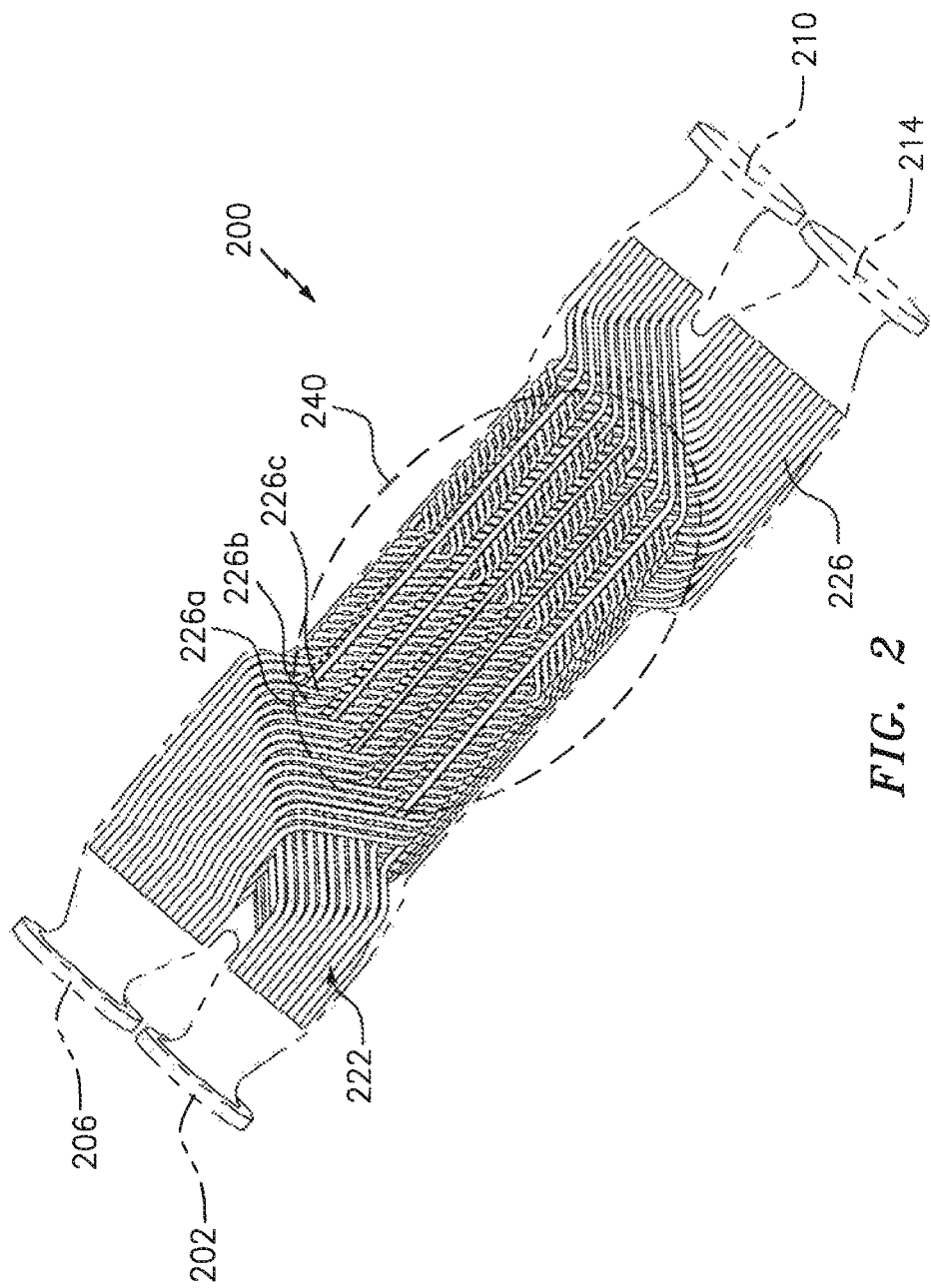
FIG. 2 illustrates a heat exchanger incorporating tubular channels in a wrapped, helical arrangement in a core region in accordance with aspects of this disclosure.

Referring now to FIG. 2, a heat exchanger 200 is shown. The heat exchanger 200 may include one or more ports, such as ports 202, 206, 210, and 214. The ports 202 and 210 may be coupled to one another via a first set/multiple of channels 222. The ports 206 and 214 may be coupled to one another via a second set/multiple of channels 226.

The channels 222 may carry/convey a first medium (e.g., a liquid, a gas, or air) at a first temperature (or first set of temperatures along a span of the channels 222) and the channels 226 may carry/convey a second medium at a second temperature (or second set of temperatures along a span of the channels 226). The first and second temperatures (or first set and second set of temperatures) may be at least partially different from one another. For example, the first medium in the channels 222 may be hotter than the second medium in the channels 226. The first medium and the second medium may be different from one another or different types of mediums; e.g., the first medium may be air and the second medium may be a liquid. As a medium traverses the channels 222 (or analogously, the channels 226), the medium may undergo a change in temperature (e.g., a decrease in temperature for the channels 222, or analogously an increase in temperature for the channels 226).

One of the port 202 and the port 210 may serve/function as a first inlet and the other of the port 202 and the port 210 may serve/function as a first outlet. Similarly, one of the port 206 and 214 may serve/function as a second inlet and the other of the port 206 and the port 214 may serve/function as a second outlet. The inlet and outlet ports may be sized to one or more (common) total flow areas to minimize/reduce pressure losses.

The second inlet described above may be configured to receive a cooling medium (e.g., fluid) from one or more sources. In the context of use on an aircraft engine, such as for example the engine 10 of FIG. 1, the second inlet may receive a cooling medium (e.g., fluid) from one or more of the low pressure compressor (LPC) section 19A, the high pressure compressor (HPC) section 19B, the fan section 18, a bleed valve, a source that is external to the engine, etc. The particular source that is used for the second inlet may be based on a state of operation of the engine or the associated aircraft, e.g., whether the aircraft is in take-off, cruise, landing/descent, etc. The output from the second outlet may be dumped/discarded, or more preferably, recycled/reused within the engine 10. For example, the output of the second outlet may be returned to one or more of the sources, may be used for purposes of cooling (e.g., turbine cooling, high pressure compressor cooling, rotor/disk cooling), etc.

In FIG. 2, the channels 222 are shown as being substantially straight in proximity to the ports 202 and 210. Similarly, the channels 226 are shown as being substantially straight in proximity to the ports 206 and 214. These straight regions of the channels 222 and 226 near the ports 202-214 may transition to a core region generally denoted by reference character/circle 240.

In FIG. 2, in the core region 240 the channels 222 are shown as being substantially straight, whereas the channels 226 are shown as assuming a helix or spiral geometry in the core region 240. This is exemplary. In some embodiments, the channels 222 may assume a helix or spiral geometry in the core region 240; e.g., the channels 222 may be braided or intertwined with the channels 226 in the core region 240. The use of helical spirals may increase the length of the associated channel and allow for an increase of time of flow within the body.

In the embodiment of FIG. 2 in the core region 240 every other channel 222 is shown as being contained within a wrapping formed by a helix/spiral of channels 226. In FIG. 2, the wrapping around each such channel 222 is based on a combination of three (3) channels 226, such as for example channels 226a, 226b, and 226c. Other counts/quantities of the channels 226 used to provide the wrapping may be included in some embodiments. The pattern of every other channel 222 in the core region being wrapped is exemplary; other patterns or other arrangements may be used.

In some embodiments, a wrapping might not be provided. For example, the core region 240 may be "wrap-free", such that the channel 222 and the channels 226 may traverse the core region 240 substantially parallel to one another. FIG. 3 illustrates an exemplary embodiment of a core region 240' where channels 222° and 226' are arranged substantially parallel to one another. The particular pattern (e.g., the order or sequence of the channels 222' and 226' alternating with respect to one another) shown in FIG. 3 is exemplary; other arrangements may be used. Combinations may also be provided; for example a core region may include a first portion that includes wrapping and a second portion that is wrap-free.

A heat exchanger incorporating parallel channels may be easier to manufacture relative to a heat exchanger incorporating wrapped channels. Still further, a parallel channel configuration might not incur as great a pressure drop/loss as the wrapped channel configuration. The particular configuration that is used for a heat exchanger and associated channels (e.g., a configuration providing for a co-mingling of channels in a core region) may be based on a trade-off or balancing of minimizing pressure loss while maximizing heat transfer capability, potentially taking into account other factors (e.g., total mass of material used). The use of spiral channels may provide better/enhanced cooling capability while straight channels/passages may be less efficient at cooling but better at maintaining pressure.

Figure 4A:
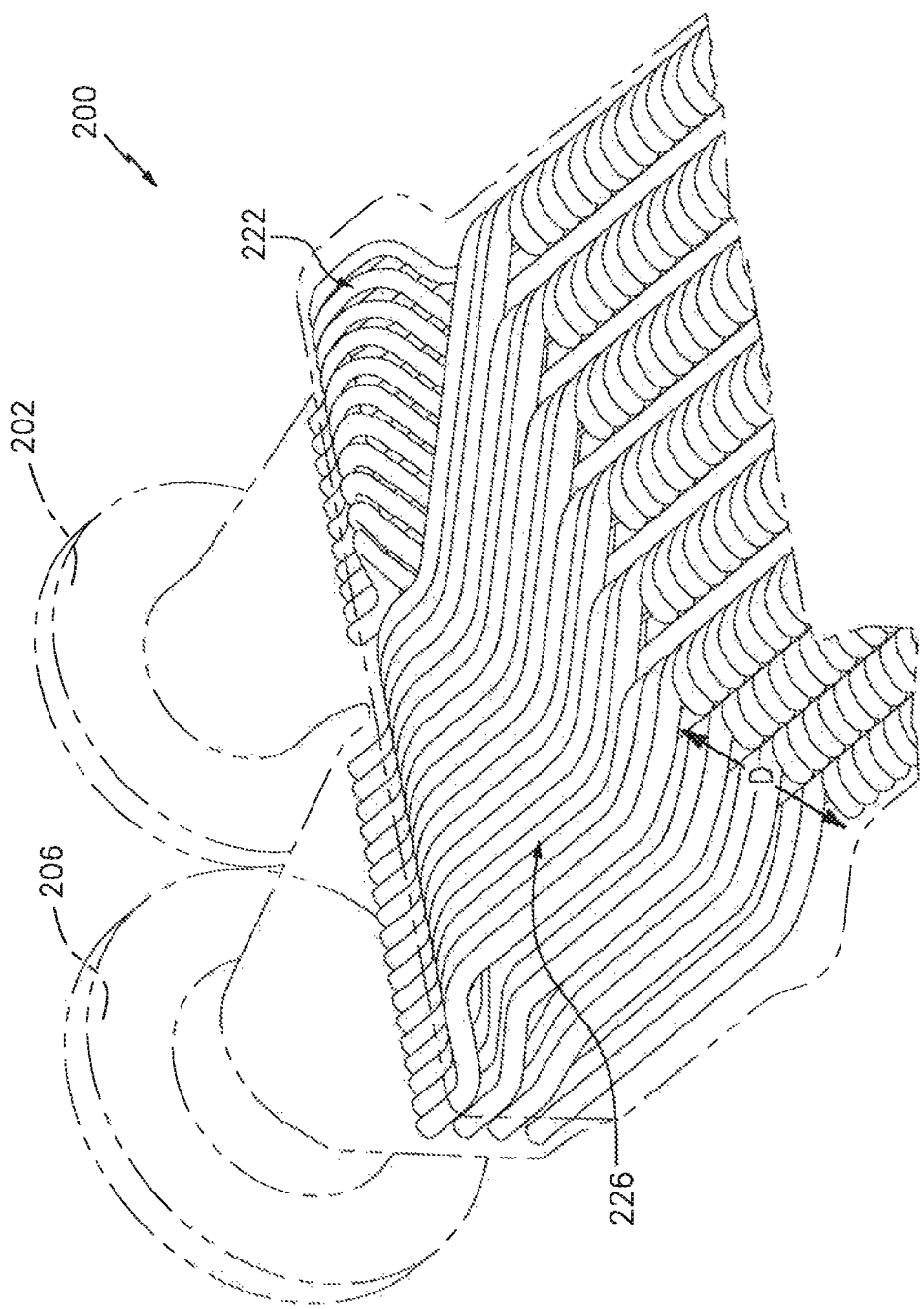
FIGS. 4A-4B illustrate a side perspective view of the heat exchanger of FIG. 2.
Figure 4B:
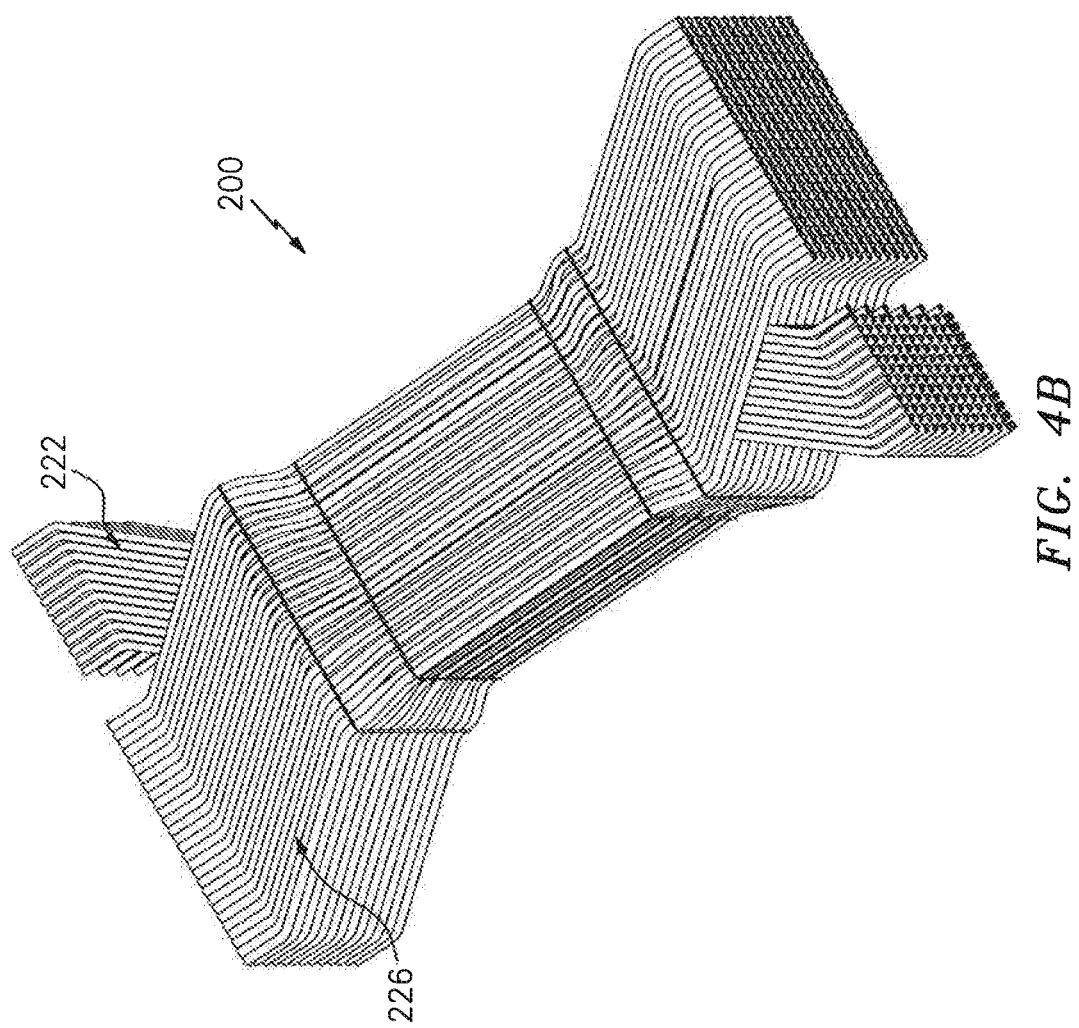
Figure 5:
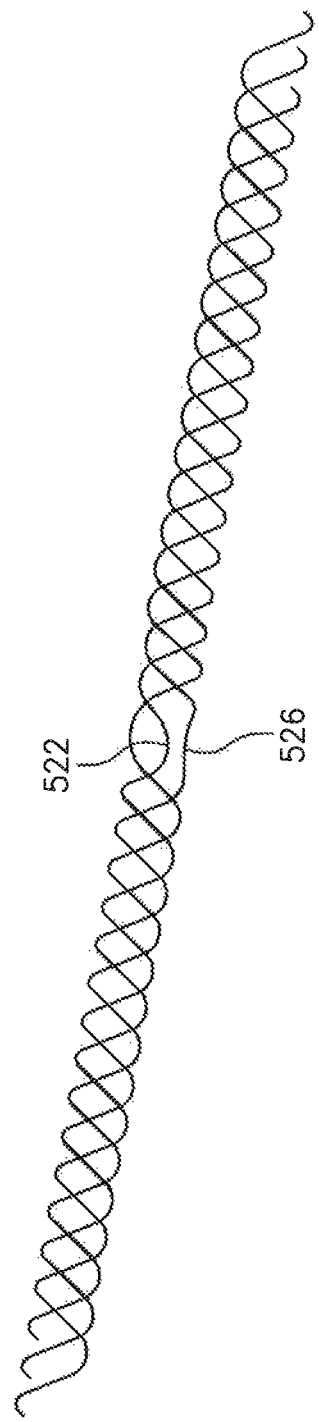
FIG. 5 illustrates tubular channels of a heat exchanger incorporating links in accordance with aspects of this disclosure.

Referring to FIG. 4A-49, a side perspective view of the heat exchanger 200 of FIG. 2 is shown. As seen in FIG. 4A-4B, the channels 222 and 226 may be arranged as part of one or more (illustratively, four in FIG. 4A) layers or planes along a dimension/depth 'D'. The use of layers/planes is exemplary. In some embodiments, a heat exchanger may be separated out to radial zones; such features may be provided dependent on the space that the heat exchanger may occupy.

In some embodiments, one or more links may be included as part of one or more channels. For example, referring to FIG. 5 an embodiment is shown of a triple helix tubular configuration, where links 522 and 526 are called-out. The links 522 and 526 may modify the orientation of the channels from a first orientation (e.g., a left-hand orientation) to a second orientation (e.g., a right-hand orientation). Modification or reversal of the orientation by a link may enable an exit geometry of the associated channel to be the same on the respective ends of the channel, or more specifically, a link may be used to maintain common inlet and outlet geometry.

In accordance with aspects of this disclosure, through the body of a heat exchanger, each hot channel may have associated cold channels which will affect it individually. These associated channels may be referred to as cells. Cells may contain varying cold channel counts and varying sizes. In some embodiments, hot and cold channels are of a similar size (e.g., sized within a threshold of one another), but they don't have to be. Cells may be strategically positioned into patterns which can be easily disseminated through a separation zone into first (e.g., hot) and second (e.g., cold) feeds. Cells can be patterned to assimilate the space that the body may occupy. As described above, these separation zones can be oriented in a planar or radial fashion.

If the thermal difference between hot and cold channels is unacceptable to maintain structural integrity of the heat exchanger body, inlet ports can be arranged so that colder, low pressure air can be brought in from opposite sides of the exchanger, as well as, hot inlet ports being placed at both ends of the exchanger. Similar considerations apply to outlet ports as well. This would mitigate vast thermal inequalities through the body, but may have a tendency to increase the size of the inlet and outlet transition zones, potentially adding weight to the system and limiting the size of the actual heat exchanging zone.

In accordance with aspects of the disclosure, a heat exchanger may be configured to provide "staged cooling". As the name implies, staged cooling may allow for a reduction in temperature along one or more dimensions (e.g., a span) of the heat exchanger or associated channels in a staged fashion, such that the temperature may be stepped-down in discrete segments. Analogously, "staged heating" may allow for an increase in temperature in stepped-up discrete segments. Furthermore, while the heat exchanger 200 is described above as mapping a (first) inlet to a (first) outlet via channels, various other configurations may be used in some embodiments. For example, a first multiple of inlets may map to a second multiple of outlets. Similarly, multiple inlets may map to a common outlet. In some embodiments, an inlet may map to multiple outlets.

Figure 6A:
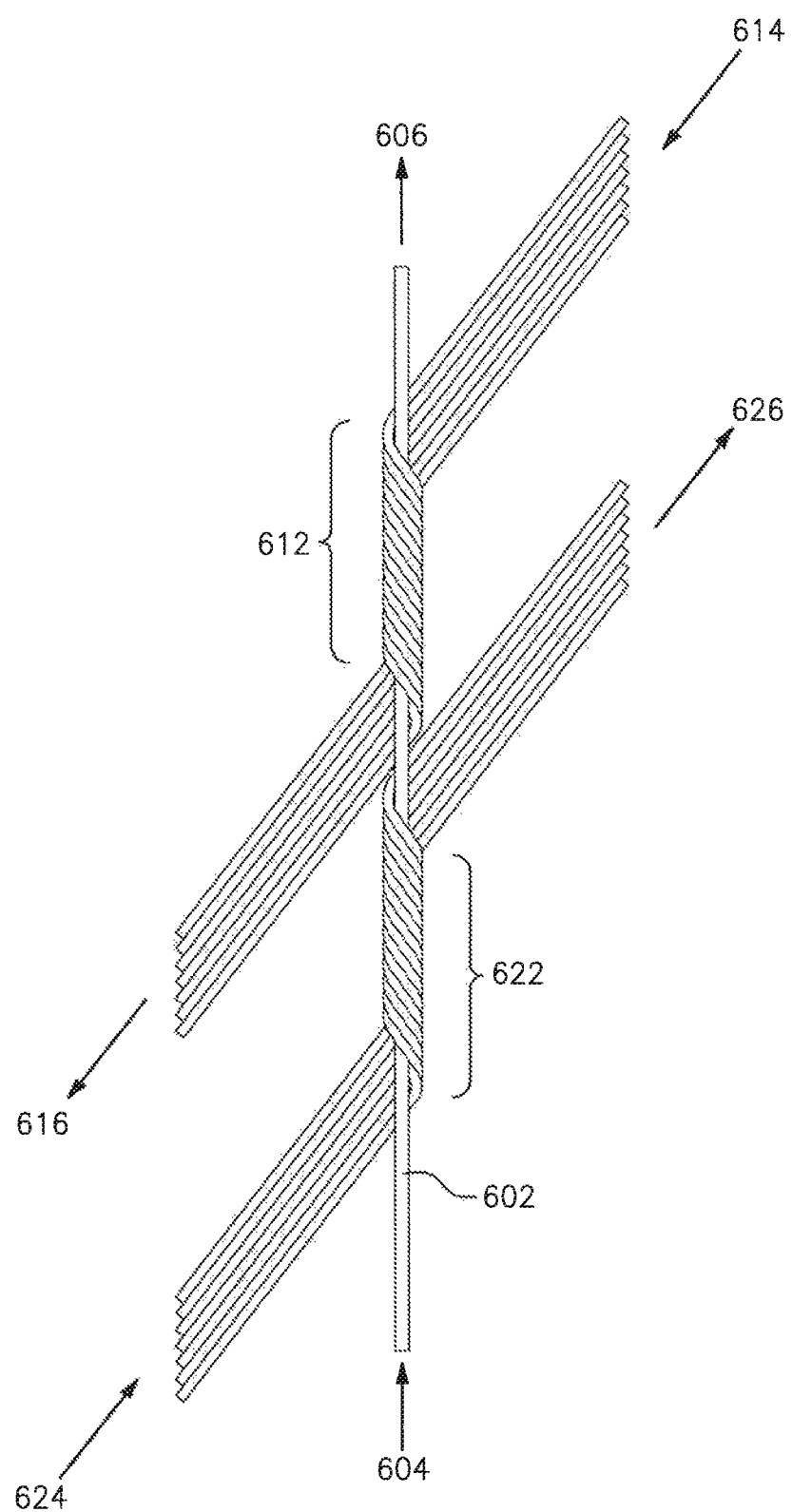
FIG. 6A illustrates a channel wrapped by a first set of channels and a second set of channels, the first set of channels having a first inlet and a first outlet and the second set of channels having a second inlet and a second outlet.

Referring to FIG. 6A, an embodiment is shown where a channel 602 is oriented between a first (inlet) end 604 and a second (outlet) end 606. The channel 602 is shown as being wrapped by a first set/multiple of channels 612, the channels 612 having a first (inlet) end 614 and a second (outlet) end 616. The channel 602 is shown as being wrapped by a second set/multiple of channels 622, the channels 622 having a first (inlet) end 624 and a second (outlet) end 626. The channels 602, 612, and 622 may convey mediums that are at one or more temperatures. For example, the channel 602 may convey a medium that is at an elevated temperature relative to the mediums conveyed by the channels 612 and 622. The mediums in the channels 612 and 622 may or might not be at the same temperature.

Figure 6B:
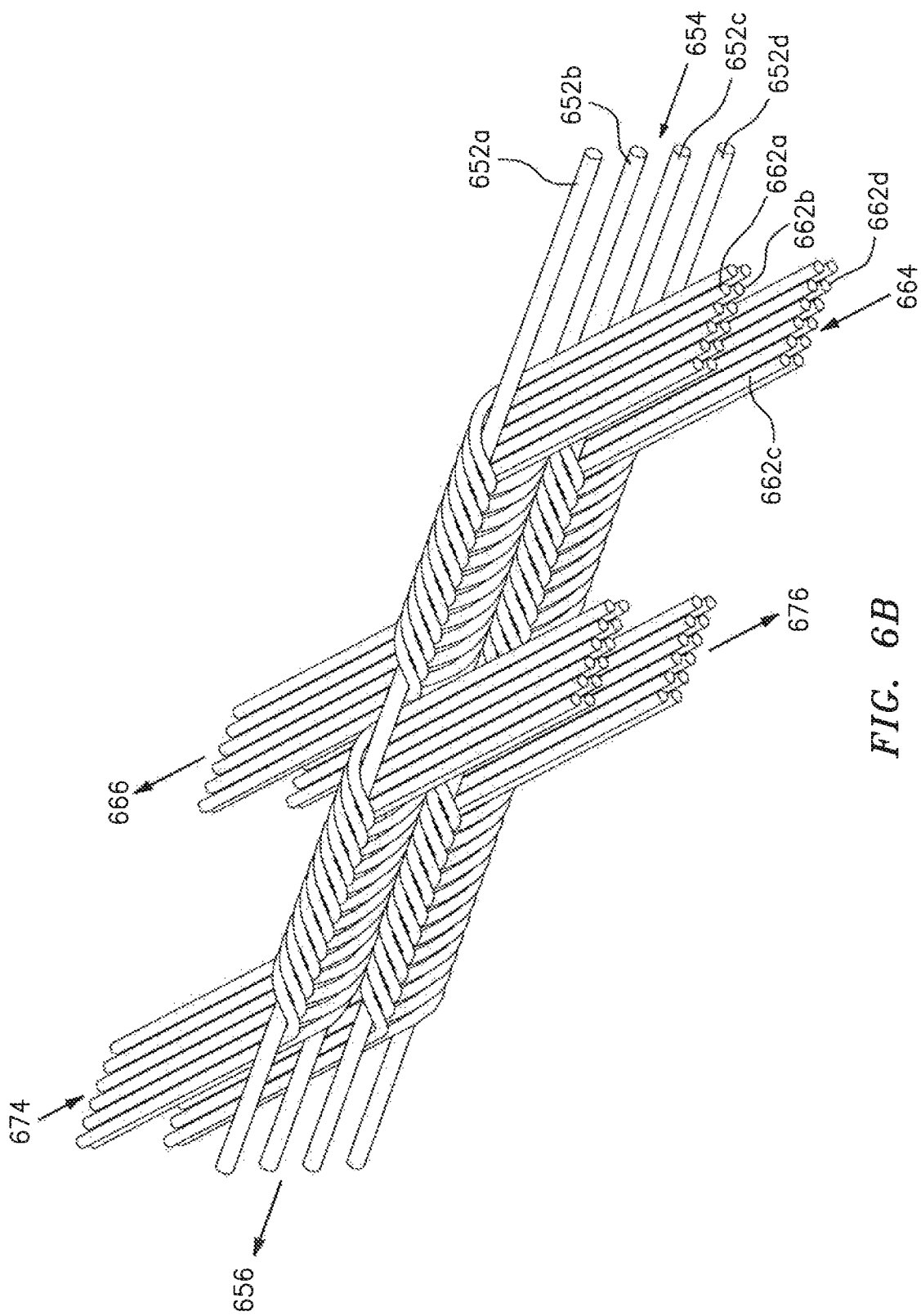
FIG. 6B illustrates a plurality of channels wrapped by multiple sets of channels, where the multiple sets of channels are associated with multiple inlets and multiple outlets.

FIG. 6B represents a variation/iteration of the embodiment shown in FIG. 6A. In FIG. 6B, a set of channels formed from channels 652a, 652b, 652c, and 652d is oriented between a first (inlet) end 654 and a second (outlet) end 656. The channel 652a is shown as being wrapped by a first set/multiple of channels 662a oriented between a first (inlet) end 664 and a second (outlet) end 666. The channel 652b is shown as being wrapped by a second set/multiple of channels 662b oriented between the end 664 and the end 666. The channel 652c is shown as being wrapped by a third set/multiple of channels 662c oriented between the end 664 and the end 666. The channel 652d is shown as being wrapped by a fourth set/multiple of channels 662d oriented between the end 664 and the end 666. Wrapping similar to that described above in connection with the channels 662a-662d may be provided around the channels 652a-652d via channels oriented between (inlet) end 674 and (outlet) end 676.

In some embodiments, a heat exchanger's temperature transfer characteristics may be adjusted based on one or more parameters. For example, in some embodiments a count of cold channels may be adjusted relative to a count of hot channels to obtain a particular heat transfer profile. In some embodiments, a first channel may be of a substantially same diameters as a second channel, or different diameters may be used. A cross-section or diameter, a length, or other characteristic of one or more channels may be selected to provide a particular heat transfer profile, potentially based on an amount of pressure loss that is tolerable in a given application environment. For example, multiple short spirals fed with a few turns and a quick exit into multiple feeds may be used to step down a hot straight channel with minimal losses.

Aspects of the disclosure are directed to a spiraling of passages to separate hot and cold channels into separate planes. Such separation may provide for a dissemination of hot and cold feed channels.

In accordance with aspects of the disclosure, a heat exchanger may be manufactured using one or more techniques. For example, an additive manufacturing technique may be used in some embodiments. In some embodiments, a helical spiral associated with a channel may provide for a channel angle that is suitable for additive manufacturing material growth. Direction of growth of the material may limit the channels to approximately 40 degrees from vertical. Helical spirals may be chosen that would mimic an equivalent rise over run. Because of the steps created through the additive manufacturing process, it may be beneficial to run a liquid polishing medium through the body to achieve a better surface finish of the channels.

In some embodiments, at distal ends of a cold channel a coiled/spiraled shape/geometry may be used, whereas the cold channels may assume a substantially straight profile through a body mass alongside one or more hot channel. The cold channels may transition to an exit plane reserved for cold channel use. The coiled geometry at the distal ends may be relatively small, e.g., as little as a quarter of one rotation to be radially adjusted to the exit plane.

In some embodiments, a rotation associated with one or more helical spirals of a channel may be reversed, potentially as part of an additive manufacturing procedure. For example, a first (e.g., right) orientation spiral helix may transition through to a second (e.g., left) orientation spiral helix through a transition link. The use of such features may facilitate maintenance of a common inlet and exit plane geometry, including a weave of separate hot and cold feed and release systems. In some embodiments, step down cooling may be obtained by operating multiple heat exchangers in, e.g., series.

Aspects of the disclosure may be applied to one or more sections or components of an engine. For example, aspects of the disclosure may be applied to air systems/bleeds, cases (e.g., a diffuser case or a combustor case), compressor rotors, compressor stators, turbines (e.g., turbine blades, turbine vanes), etc. Still further, aspects of the disclosure may be applied in other applications environments or contexts, such as for example power turbines and industrial gas turbines. Aspects of the disclosure may be applied in an environment/context where thermal management is a consideration.

Technical effects and benefits of the disclosure include an extension of a useable lifetime of one or more components of an engine. For example, a component may operate for a longer duration if the temperature of cooling air supplied to the component is lowered/reduced. By lowering the temperature of cooling air, combustion may be provisioned to occur at increased temperatures or pressures, maximizing engine performance/thrust.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure.

What is claimed is:

1. A gas turbine engine comprising:
a fan section;
a low pressure compressor section that provides a low pressure compressed airflow;
a high pressure compressor section that receives the low pressure compressed airflow;
a combustor section;
a high pressure turbine section;
a low pressure turbine section;
a heat exchanger, comprising
a first plurality of tubes defining a respective first plurality of airflow channels that receive a first compressed airflow from at least one of the fan section or the low pressure compressor at a first set of air temperatures along a first span of the first plurality of airflow channels, the first set of air temperatures including a first air inlet temperature and a first air outlet temperature;
a second plurality of tubes defining a respective second plurality of airflow channels that receive a second compressed airflow from at least one of the high pressure compressor section, the high pressure turbine section or the low pressure turbine section at a second set of air temperatures along a second span of the second plurality of airflow channels, the second set of air temperatures being at least partially different from the first set of air temperatures and including a second air inlet temperature and a second air outlet temperature; and
a core region wherein the first plurality of tubes and the second plurality of tubes are co-mingled with respect to one another, wherein the first plurality of tubes are parallel to the second plurality of tubes in a first portion of the core region, wherein at least one tube of the second plurality of tubes is wrapped around a first at least one tube of the first plurality of tubes in a second portion of the core region so as to form a spiral shape around the first at least one tube of the first plurality of tubes and wherein a second at least one tube of the first plurality of tubes is wrap free throughout the second portion of the core region, and wherein each tube of the first plurality of tubes extends in a straight direction through the core region.

2. The gas turbine engine of claim 1,
wherein the heat exchanger further comprises
a third plurality of tubes defining a respective third plurality of fluid channels that receive a fluid which is different than the first compressed airflow and the second compressed airflow;
wherein the first at least one tube of the first plurality of tubes is at least partially wrapped by at least one tube of the third plurality of tubes in the core region downstream of a location where the first at least one tube of the first plurality of tubes is at least partially wrapped by the at least one tube of the second plurality of tubes, with respect to a flow of the first compressed airflow through the first plurality of tubes.

3. The gas turbine engine of claim 1, the heat exchanger further comprising:
a first port coupled to a first end of the first plurality of airflow channels;
a second port coupled to a second end of the first plurality of airflow channels;
a third port coupled to a first end of the second plurality of airflow channels; and
a fourth port coupled to a second end of the second plurality of airflow channels.

4. The gas turbine engine of claim 3, wherein the first and third ports are configured as inlets, and wherein the second and fourth ports are configured as outlets.

5. The gas turbine engine of claim 1, wherein at least one of the first plurality of airflow channels and the second plurality of airflow channels is arranged as a plurality of layers.

6. The gas turbine engine of claim 1, wherein a first airflow channel of the first plurality of airflow channels includes at least one link configured to reverse an orientation of the first airflow channel.

7. The gas turbine engine of claim 1, wherein the first set of air temperatures is greater than the second set of air temperatures, and wherein the air temperature of the first plurality of airflow channels is reduced in stages along at least one dimension of the first plurality of airflow channels.

8. The gas turbine engine of claim 1, the heat exchanger further comprising:
a first plurality of inlets that map to a second plurality of outlets.

9. The gas turbine engine of claim 1, the heat exchanger further comprising:
a plurality of inlets that map to a common outlet.

10. The gas turbine engine of claim 1, the heat exchanger further comprising:
an inlet that maps to a plurality of outlets.

11. The gas turbine engine of claim 1, wherein the at least one tube of the second plurality of tubes wrapped around the at least one tube of the first plurality of tubes includes a plurality of tubes.

* * * * *